United States Patent
Bakken et al.

(10) Patent No.: US 9,841,862 B2
(45) Date of Patent: Dec. 12, 2017

(54) STYLUS POSITION SYSTEM

(71) Applicants: Vemund Kval Bakken, Menlo Park, CA (US); Izhar Bentov, Sunnyvale, CA (US); Vivek Pant, San Jose, CA (US)

(72) Inventors: Vemund Kval Bakken, Menlo Park, CA (US); Izhar Bentov, Sunnyvale, CA (US); Vivek Pant, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 47 days.

(21) Appl. No.: 13/653,247

(22) Filed: Oct. 16, 2012

(65) Prior Publication Data

US 2014/0104187 A1    Apr. 17, 2014

(51) Int. Cl.
| | |
|---|---|
| G06F 3/041 | (2006.01) |
| G06F 3/045 | (2006.01) |
| G06F 3/046 | (2006.01) |
| G06F 3/044 | (2006.01) |
| G06F 3/0354 | (2013.01) |

(52) U.S. Cl.
CPC .......... *G06F 3/046* (2013.01); *G06F 3/03545* (2013.01); *G06F 3/044* (2013.01)

(58) Field of Classification Search
CPC .... G06F 3/03545; G06F 3/041; G06F 3/0412; G06F 3/044; H04B 10/5053; H04B 1/0483; H04B 7/0413; H04J 14/06
See application file for complete search history.

(56) References Cited

U.S. PATENT DOCUMENTS

| | | | | |
|---|---|---|---|---|
| 5,194,852 | A | * | 3/1993 | More ................. G06F 3/04883 178/18.03 |
| 7,663,607 | B2 | | 2/2010 | Hotelling |
| 7,812,827 | B2 | | 10/2010 | Hotelling et al. |
| 7,864,503 | B2 | | 1/2011 | Chang |

(Continued)

FOREIGN PATENT DOCUMENTS

WO    WO 2012/129247    9/2012

OTHER PUBLICATIONS

U.S. Appl. No. 61/454,950, filed Mar. 21, 2011, Lynch.

(Continued)

*Primary Examiner* — Alexander Eisen
*Assistant Examiner* — Nan-Ying Yang
(74) *Attorney, Agent, or Firm* — Baker Botts L.L.P.

(57) ABSTRACT

A system of one embodiment includes a touch-sensing device and a stylus. The touch sensing device includes an electrode array, which includes a plurality of electrode line pairs, and a controller. Each electrode line pair includes a first and second electrode line to send a first and second signal, respectively. The stylus includes a sensor to measure the first and second signals, a signal processor to determine position information, and a transmitter to send position information to the touch-sensing device.

A method of another embodiment includes sending, by a first electrode line, a first signal having a first frequency. A second electrode line sends a second signal having a second frequency. A stylus receives the first and second signals. The stylus sends a response signal to the touch-sensing device based on the first and second signals. A position of the stylus is determined based on the first and second signals.

19 Claims, 5 Drawing Sheets

(56) References Cited

U.S. PATENT DOCUMENTS

| | | | |
|---|---|---|---|
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,723,824 | B2 | 5/2014 | Myers |
| 2007/0109274 | A1 | 5/2007 | Reynolds |
| 2008/0158165 | A1 | 7/2008 | Geaghan et al. |
| 2008/0158167 | A1 | 7/2008 | Hotellilng et al. |
| 2008/0309635 | A1 | 12/2008 | Matsuo |
| 2009/0153500 | A1 | 6/2009 | Cho et al. |
| 2009/0315854 | A1 | 12/2009 | Matsuo |
| 2010/0155153 | A1* | 6/2010 | Zachut .................. 178/18.03 |
| 2011/0063993 | A1 | 3/2011 | Wilson et al. |
| 2011/0084857 | A1 | 4/2011 | Marino et al. |
| 2011/0175834 | A1 | 7/2011 | Han |
| 2012/0044192 | A1 | 2/2012 | Hsu et al. |
| 2012/0050207 | A1* | 3/2012 | Westhues ............... G06F 3/044 345/174 |
| 2012/0105362 | A1 | 5/2012 | Kremin et al. |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2012/0327041 | A1* | 12/2012 | Harley et al. .............. 345/179 |
| 2012/0327042 | A1* | 12/2012 | Harley et al. .............. 345/179 |
| 2013/0076612 | A1 | 3/2013 | Myers |
| 2013/0106798 | A1 | 5/2013 | Sundara-Rajan et al. |
| 2014/0049478 | A1 | 2/2014 | Brunet et al. |
| 2014/0104188 | A1 | 4/2014 | Bakken et al. |
| 2014/0111464 | A1 | 4/2014 | Bakken et al. |

OTHER PUBLICATIONS

U.S. Appl. No. 61/454,936, filed Mar. 21, 2011, Myers.
U.S. Appl. No. 61/454,950, Mar. 21, 2011, Lynch.
U.S. Appl. No. 61/454,894, filed Mar. 21, 2011, Rothkopf.
Bakken et al., U.S. Appl. No. 13/653,300, Non-final Office Action, dated Sep. 11, 2014.
Bakken et al., U.S. Appl. No. 13/653,300, Response to Non-final Office Action, dated Dec. 11, 2014.
Bakken et al., U.S. Appl. No. 13/653,300, Final Office Action, dated Mar. 26, 2015.
Bakken et al., U.S. Appl. No. 13/653,300, Response to Non-final Office Action, dated May 26, 2015.
Bakken et al., U.S. Appl. No. 13/653,300, Non-final Office Action, dated Jul. 30, 2015.
Bakken et al., U.S. Appl. No. 13/653,300, Response to Non-final Office Action, dated Nov. 30, 2015.
Bakken et al., U.S. Appl. No. 13/654,996, Non-final Office Action, dated Jul. 31, 2014.
Bakken et al., U.S. Appl. No. 13/654,996, Response to Non-final Office Action, dated Dec. 1, 2014.
Bakken et al., U.S. Appl. No. 13/654,996, Final Office Action, dated Mar. 25, 2015.
Bakken et al., U.S. Appl. No. 13/654,996, Request for Continued Examination and Response, dated Jun. 25, 2015.
Bakken et al., U.S. Appl. No. 13/654,996, Non-final Office Action, dated Aug. 27, 2015.
Bakken et al., U.S. Appl. No. 13/654,996, Response to Non-Final Office Action filed Jan. 27, 2016.
Bakken et al., U.S. Appl. No. 13/654,996, Final Office Action dated May 2, 2016.
V. K. Bakken, U.S. Appl. No. 13/653,300, Final Office Action dated Jul. 14, 2016.
V. K. Bakken, U.S. Appl. No. 13/653,300, Response to Final Office Action filed Sep. 14, 2016.
V. K. Bakken, U.S. Appl. No. 13/653,300, Advisory Action dated Oct. 20, 2016.
V. K. Bakken, U.S. Appl. No. 13/654,996, Request for Continued Examination and Amendment filed Nov. 1, 2016.
V. K. Bakken, U.S. Appl. No. 13/653,300, Request for Continued Examination and Amendment filed Nov. 14, 2016.
V. K. Bakken, U.S. Appl. No. 13/653,300, Non-final Office Action dated Nov. 29, 2016.
V. K. Bakken, U.S. Appl. No. 13/654,996, Non-final Office Action dated Nov. 30, 2016.

* cited by examiner

STYLUS POSITION SYSTEM

TECHNICAL FIELD

The present invention relates generally to the field of touch-sensing devices and more particularly to a stylus position system.

BACKGROUND

Conventional touch-sensing devices may detect the presence and location of a touch or the proximity of an object (such as a user's finger or a stylus) within a touch-sensitive area. A touch-sensing device may be, or may be associated with, a desktop computer, laptop computer, tablet computer, personal digital assistant (PDA), smartphone, satellite navigation device, portable media player, portable game console, kiosk computer, point-of-sale device, household appliance, or other suitable device.

Conventional touch-sensing devices may utilize different types of touch-sensitive technologies such as, for example, resistive touch-sensing devices, surface acoustic wave touch-sensing devices, and capacitive touch-sensing devices. In capacitive touch-sensing devices, when an object touches or is brought in proximity to an electrode array of a touch-sensing device, a change in capacitance may occur within the electrode array at the location of the touch or proximity. The touch-sensing device may then process the change in capacitance to determine the position of the object.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1:
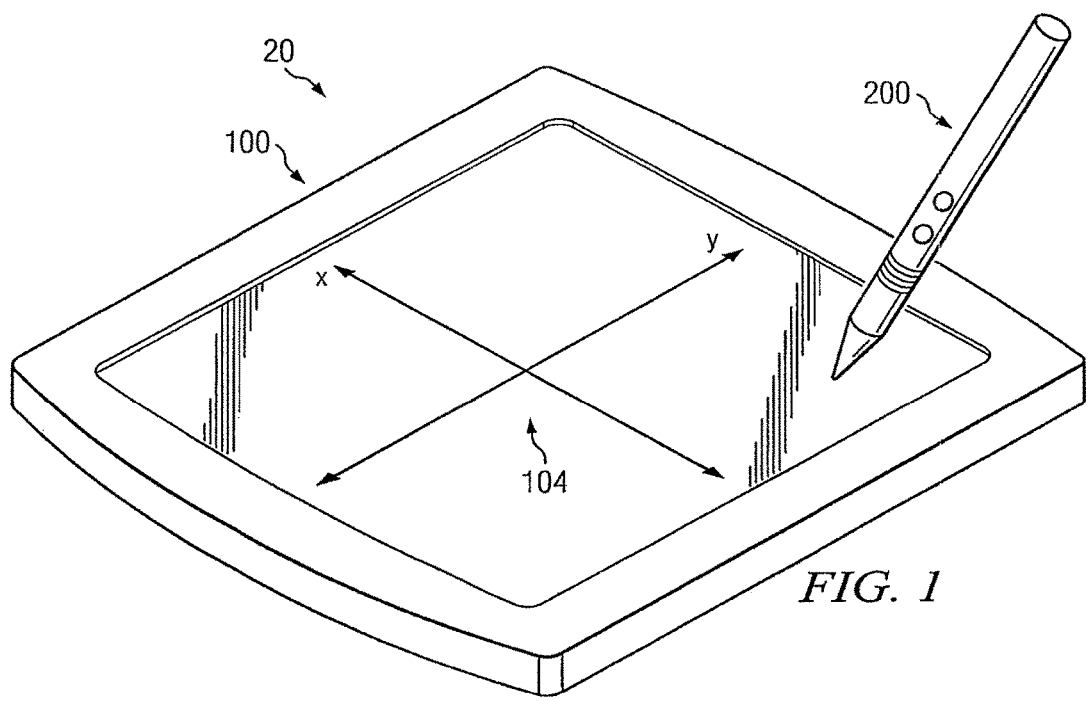
FIG. 1 illustrates an example touch-sensing system.

According to one embodiment, a method includes generating, by a stylus, a composite signal. The composite signal includes a first signal having a first frequency, the first signal being used by a touch-sensing device to determine a position of the stylus relative to the touch-sensing device, and a second signal having a second frequency. The second signal includes information indicating a status of the stylus, and the second frequency is higher than the first frequency, though in other embodiments, the second frequency may be less than or equal to the first frequency. The information indicating the status of the stylus may include battery information, orientation information, sensory information (such as information indicating an amount of force exerted on the tip of the stylus, information indicating a status of a button of the stylus, etc.) information indicating input from a user of the stylus, and/or information indicating the distance between the tip of the stylus and the touch-sensing device. The stylus sends the composite signal to the touch-sensing device. Utilizing a composite signal in this manner may allow for the transmission of different types of status information, such as battery status, stylus orientation, the stylus's distance from the touch-sensing device, and the amount of force exerted on a portion of the stylus, over the same components that are used to detect the position of the stylus. This may reduce the need for additional transceiver hardware, allow for more efficient communication between the stylus and the touch-sensing device, make communication between the stylus and touch-sensing device less prone to noise, and/or increase the throughput of data transmission. Various embodiments may provide some, all, or none of these benefits.

According to another embodiment, a system includes a touch-sensing device and a stylus. The touch sensing device includes an electrode array and a controller configured to control the electrode array. The electrode array includes a plurality of electrode line pairs, and each electrode line pair includes a first electrode line configured to send a first signal and a second electrode line configured to send a second signal. The stylus includes a sensor configured to measure the first signal and the second signal, a signal processor configured to determine position information based at least on the first signal and second signal, and a transmitter configured to send a signal comprising the position information to the touch sensing device. In certain embodiments, the first and second signals may be differentiated by using quadrature phase-shifting, signal encoding, frequency modulation; amplitude modulation; phase modulation; or other suitable means for differentiating signals. This may allow the stylus to determine its own position, improve positional accuracy, and/or provide more efficient utilization of touch-sensing hardware. Various embodiments may provide some, all, or none of these benefits. Various embodiments may provide some, all, or none of these benefits.

In yet another embodiment, a method includes generating, by a touch-sensing device, a first signal comprising information identifying a first electrode line of an electrode array of the touch-sensing device, the first signal having a first strength. The first electrode line sends the first signal to a stylus, which receives the first signal, the first signal having a received strength. The stylus sends a second signal comprising information based on the received first signal, and the touch-sensing device receives the second the second signal. A position of the stylus is determined based at least in part on the information identifying the first electrode line and the received strength of the first signal. This signaling scheme may improve the ability of stylus and finger-sensing to coexist and may also reduce interference between finger-sensing and stylus-sensing that may occur when both utilize the same electrode array.

FIG. 1 illustrates an example touch-sensing system 20. Touch-sensing system 20 includes stylus 200 and touch-sensing device 100, which has touch-sensitive area 104. Touch-sensing device 100 may be a tablet computer, smart phone, touchpad, or other device configured to detect the presence of stylus 200 on or near touch-sensitive area 104. Touch-sensing device 100 may have a display (not shown) situated behind touch-sensitive area 104. The display may be a liquid crystal display (LCD), an LED display, an LEDbacklight LCD, or any other suitable display, and the display may be visible through an electrode array (not shown) or a cover panel (not shown).

Stylus 200 may be an active stylus configured to communicate with touch-sensing device 100. Stylus 200 may interact or communicate with touch-sensing device 100 when brought in contact with or in proximity to touch-sensitive area 104. In certain embodiments, interaction between stylus 200 and touch-sensing device 100 may be capacitive or inductive. For example, in some embodiments, when stylus 200 is brought in contact with or in proximity to touch-sensitive area 104, signals generated by stylus 200 may influence capacitive electrodes of touch-sensing device 100, or signals generated by touch-sensing device 100 may influence capacitive electrodes of stylus 200. In other embodiments, a power source of stylus 200 may be inductively charged by touch-sensing device 100, or a power source of touch-sensing device 100 may be charged by stylus 200. Other embodiments may utilize any suitable method of interaction and/or communication between stylus 200 and touch-sensing device 100 in place of or in addition to capacitance and induction, such as mechanical forces, current, voltage, or electromagnetic fields. The capacitive coupling, inductive coupling, and other coupling mechanisms may be utilized for a variety of purposes, such as detecting a position of stylus 200 or a finger and communicating information between stylus 200 and touch-sensing device 100.

Figure 2:
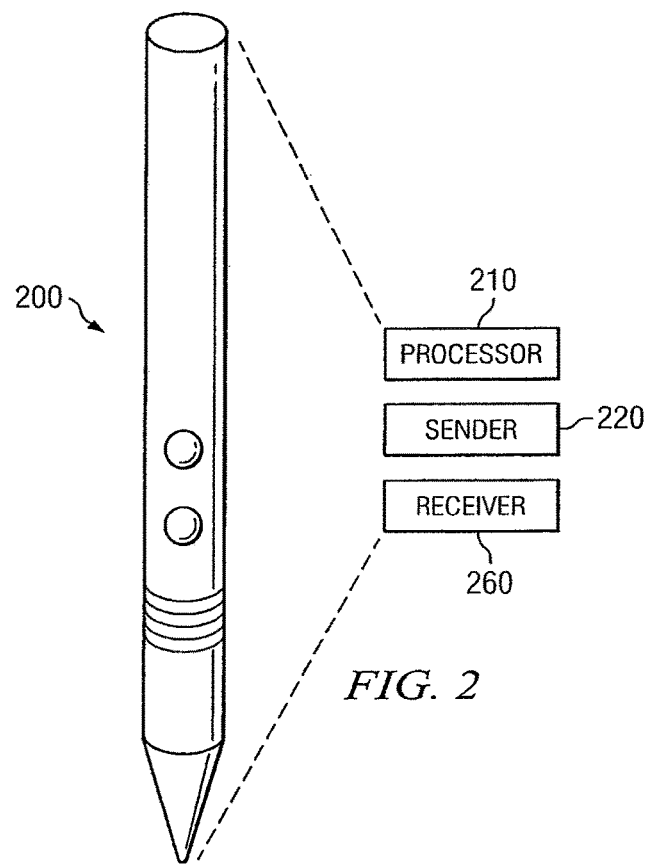
FIG. 2 illustrates an example stylus that may be used in a touch-sensing system.

FIG. 2 illustrates an example stylus 200 that may be used in touch-sensing system 20 from FIG. 1. Stylus 200 includes processor 210, sender 220, and receiver 260. In other embodiments, stylus 200 may include processor 210 and sender 220, but not receiver 260. Processor 210 may control sender 220 and receiver 260. Receiver 260 may be configured to detect a signal generated by touch-sensing device 100 (not shown). Sender 220 may be configured to generate a signal that is received by touch-sensitive device 100 and used to determine the position of stylus 200 and/or information indicating a status of stylus 200. For example, sender 220 may generate a drive signal that is detected by touch-sensing device 100 and used to identify the position of stylus 200. In some embodiments, the drive signal may be detected by a capacitive electrode array of touch-sensing device 100 as described above.

In some embodiments, sender 220 generates a composite signal containing both the drive signal, which may be used to determine the position of stylus 200, as well as a data signal that contains information indicating a status of stylus 200. The status of stylus 200 may include, but is not limited to, the orientation of the stylus, whether a portion of the stylus is within a threshold distance of a portion of touch-sensing device 100, sensory information (such as an amount of force exerted on the tip of the stylus, a status of a button of the stylus, etc.) and/or the status of a battery. For example, stylus 200 may encode the drive signal with information indicating the amount of pressure on the tip of stylus 200. The composite signal may also communicate the orientation of stylus 200, which may be based on gyroscopic information, or the distance of stylus 200 from touch-sensitive area 104, which may be used to determine whether stylus 200 is in a "hover mode" with its tip positioned within a threshold distance. In various embodiments, the composite signal may include some, all, or none of this information.

The composite signal may be detected by the same capacitive electrode array of touch-sensing device 100 that is utilized to determine the position of stylus 200. Communicating this status information to touch-sensing device 100 via electrode array 110 may reduce the need for additional transceiver hardware, allow for more efficient communication between the stylus and the touch-sensing device, make communication between the stylus and touch-sensing device less prone to noise, and/or increase the throughput of data transmission.

Sender 220 may also send information to touch-sensing device 100 via a wireless transmitter. For example, in a some embodiments, sender 220 generates a radio frequency (RF) signal (or an electromagnetic signal with another frequency) with an antenna, the signal containing information indicating the position of the stylus and/or a status of the stylus. In various embodiments, stylus 220 may include a single sender 220 configured to perform one of the functions described above, a single sender 220 configured to perform multiple functions, or multiple senders 220.

Figure 3:
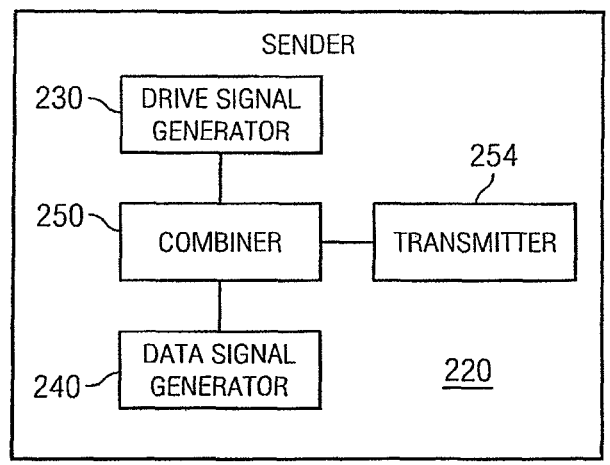
FIG. 3 illustrates an example sender that may be used in a stylus.

FIG. 3 illustrates an example sender 220 that may be used in stylus 200 from FIG. 2. The example sender 220 may use frequency division multiplexing to combine the drive signal and data signal into a composite signal. Sender 220 includes drive signal generator 230 and data signal generator 240, which are connected to combiner 250. Combiner 250 is connected to transmitter 254. Other embodiments utilizing time division multiplexing (not shown) may not include combiner 250 and may interleave transmission of the drive signal and data signal by alternating between transmission of the drive signal and the data signal.

In some embodiments, drive signal generator 230 may generate a drive signal by utilizing a voltage driver. In some embodiments the voltage driver may generate voltages between 5 to 50 V, though this range is not required. In other embodiments, the voltage driver may generate voltages between 12 and 20 V. In a particular embodiment, the voltage driver may generate a voltage of approximately 16 V. Data signal generator 240 may generate a data signal by modulating a carrier signal with a modulation signal that contains information indicating a status of stylus 200. For example, stylus 200 may encode the drive signal with information indicating its battery status and/or the amount of pressure on its tip. Stylus 200 may also encode information indicating its orientation, which may be based on gyroscopic information, and/or the distance of stylus 200 from touch-sensitive area 104, which may be used to determine whether stylus 200 is in a hover mode. The drive signal and the data signal may serve as inputs to combiner 250, which may combine the drive signal and the data signal into a composite signal using, for example, frequency division multiplexing. In alternative embodiments, the composite signal may be generated using time division multiplexing.

Combiner 250 may then send the composite signal to transmitter 254, which may transmit the composite signal to touch-sensing device 100 (not shown). In some embodiments this transmission may utilize the capacitive or inductive touch-sensing elements of touch-sensing device 100 described above. For example, a drive signal, now encoded with status information, may be sensed by electrode array 110 (not shown) based on a change in capacitance caused by the drive signal. This received composite signal may then be processed by one or more receive channels of touch-sensing device 100 so that the same signal can be used to determine stylus position information (which can be determined by measuring the change in capacitance at a plurality of electrode lines of electrode array 110) and the status information (which can be determined by processing the composite signal as a function of the data signal frequency). Sending the composite signal in this manner may allow for the transmission of different types of status information (such as the amount of force exerted on a portion of the stylus, the orientation of the stylus, whether a portion of the stylus is within a threshold distance of a portion of touch-sensing device 100, and/or the status of a battery) over the same components that are used to detect the position of the stylus, which may reduce the need for additional transceiver hardware in stylus 200 and touch-sensing device 100. Furthermore, the composite signal can be processed simultaneously by two or more receive channels, which may improve data throughput.

The data signal may have a higher frequency than the drive signal. For example, in some embodiments, the drive signal may have a frequency between 30 and 300 Hz, though this frequency range is not required. In other embodiments, the drive signal may have a frequency between 50 and 200 Hz. In a particular embodiment, the drive signal may have a frequency of approximately 100 Hz. Furthermore, in some embodiments, the data signal may have a frequency between 300 Hz and 300 GHz, though this frequency range is not required. In other embodiments, the data signal may have a frequency between 1 KHz and 5 GHz. In a particular embodiment, the data signal may have a frequency of approximately 2.4 GHz. In some embodiments, the frequency of the data signal may be at least twice the frequency of the drive signal frequency. The higher frequency of the data signal may allow for transmission of larger quantities of data that may be used to communicate the status of stylus 200. The higher frequency of the data signal may also allow for transmission of the data signal via the same electrode array used to determine stylus position without disrupting the normal operation of the touch sensor.

Figure 4:
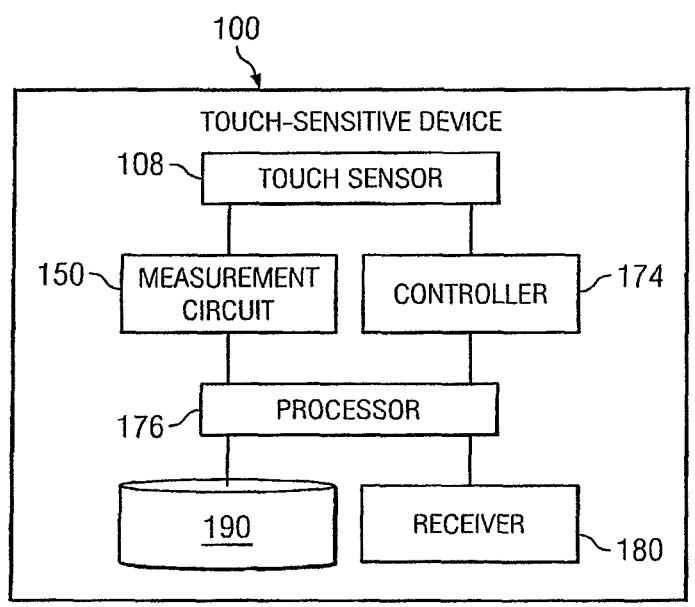
FIG. 4 illustrates an example touch-sensing device that may be used in a touch-sensing system.

FIG. 4 illustrates an example touch-sensing device 100 that may be used in touch-sensing system 20 from FIG. 1. Touch-sensing device 100 includes electrode array 110, measurement circuit 150, controller 174, processor 176, receiver 180, and memory 190. As shown in FIG. 4, electrode array 110 is connected to measurement circuit 150 and controller 174, which are both connected to processor 176. Processor 176 may also be connected to receiver 180 and memory 190. Receiver 180 may receive signals from a different medium or using different techniques from those involving electrode array 110, described above. Some embodiments may have multiple receivers 180, while others may not include receiver 180.

Touch sensor 108 and controller 174 may detect the presence and location of a touch or the proximity of an object within a touch-sensitive area of touch sensor 108. Herein, reference to a touch sensor may encompass both the touch sensor and its controller, where appropriate. Touch sensor 108 includes one or more touch-sensitive areas. In some embodiments, touch sensor 108 may include electrode array 110 (shown in FIG. 6). Electrode array 110 may be a plurality of electrode lines, which may be drive and sense electrodes (or an array of electrodes of a single type), disposed on one or more substrates, which may be made of a dielectric material. Herein, an electrode line may refer to a single conductive wire, a series of electrodes position in a line, or any other suitable electronic structure or series of electronic structures defining a line shape or other pattern. Such electrode lines may operate to detect finger and/or stylus position by mutual capacitance, self capacitance, induction, or any other suitable method of position detection. Herein, reference to an electrode array may encompass both the electrodes of the touch sensor as well as the substrate(s) on which they are disposed. An electrode (whether a ground electrode, a guard electrode, a drive electrode, or a sense electrode) may be an area of conductive material forming a shape, such as for example a disc, square, rectangle, thin line, loop, other suitable shape, or suitable combination of these. In some embodiments, one or more cuts in one or more layers of conductive material may create the shape of an electrode, and the area of the shape may be bounded by those cuts. Furthermore, touch sensors, electrode arrays, and electrode lines may be referred to as generating and/or sending a signal. In such cases, while the signal itself may be produced as a result of physical changes in the touch sensor or components of the touch sensor, the generation of the signal may be driven by the electrode array itself, the controller, and/or other components of touch-sensing device 100.

Measurement circuit 150 may include circuitry configured to process signals received by electrode array 110. The output of measurement circuit 150 may then be passed to processor 176 for further analysis, and the resulting information may be stored in memory 190. Memory 190 also stores instructions that may be operable to, when executed by processor 176, direct the operation of controller 174 and perform other operations. Controller 174 may be configured to control the operation of electrode array 110. For example, controller 174 may control the generation and/or sending of signals by electrode array 110. In some embodiments, controller 174 may control the generation and/or sending of a composite signal including a data signal and a drive signal by electrode array 110. Controller 174 may also control the detection of signals by electrode array 110 and/or measurement circuit 150.

Measurement circuit 150 and controller 174 may each contain multiple electronic structures on one or more chips. In some embodiments, measurement circuit 150 and controller 174 may be included in a single chip or other structure. Various operations of measurement circuit 150 and controller 174 may be controlled by hardware or by software stored in memory 190 or another memory device of touch-sensing device 100.

Figure 5:
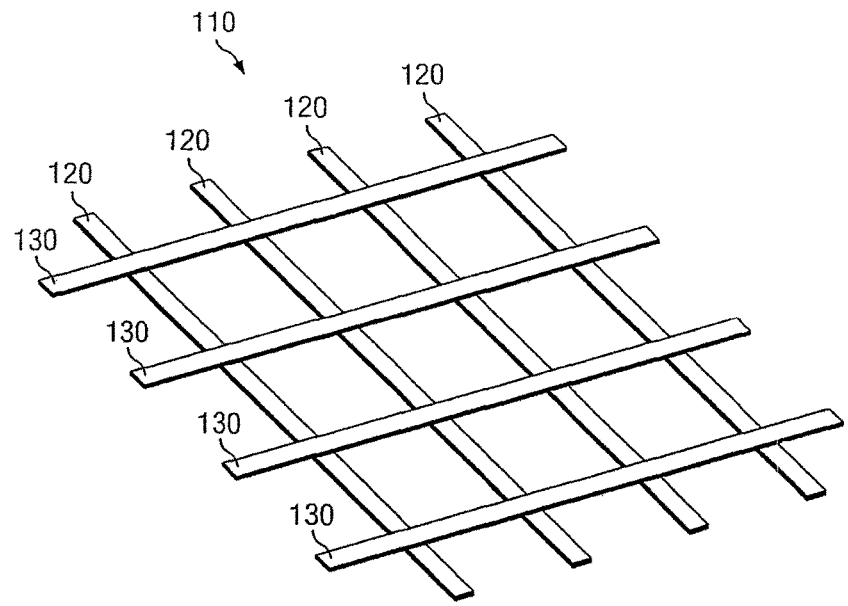
FIG. 5 illustrates an example electrode array that may be used in a touch-sensing device.

FIG. 5 illustrates an example electrode array 110 that may be used in touch-sensing device 100 from FIG. 4. Electrode array 100 includes electrode lines 120 and electrode lines 130. Electrode lines 120 and 130 may be drive and/or sense lines. Controller 174 may control the operation of electrode lines 120 and 130 such that each electrode line may operate as a drive line at one time and as a signal line at another time.

As shown in FIG. 5, in some embodiments, electrode lines 120 and 130 form a grid pattern, and electrode lines 120 may be orthogonal to electrode lines 130. In other embodiments, electrode lines 120 and 130 may have other orientations and layouts. For example, electrode lines 120 may be curved, zigzagged, randomized, or have different orientations from one another, as may electrode lines 130. Furthermore, certain embodiments may include multiple electrode arrays disposed in multiple layers, or electrode lines 120 may be disposed in a first layer while electrode lines 130 are disposed in a second layer.

Figure 6:
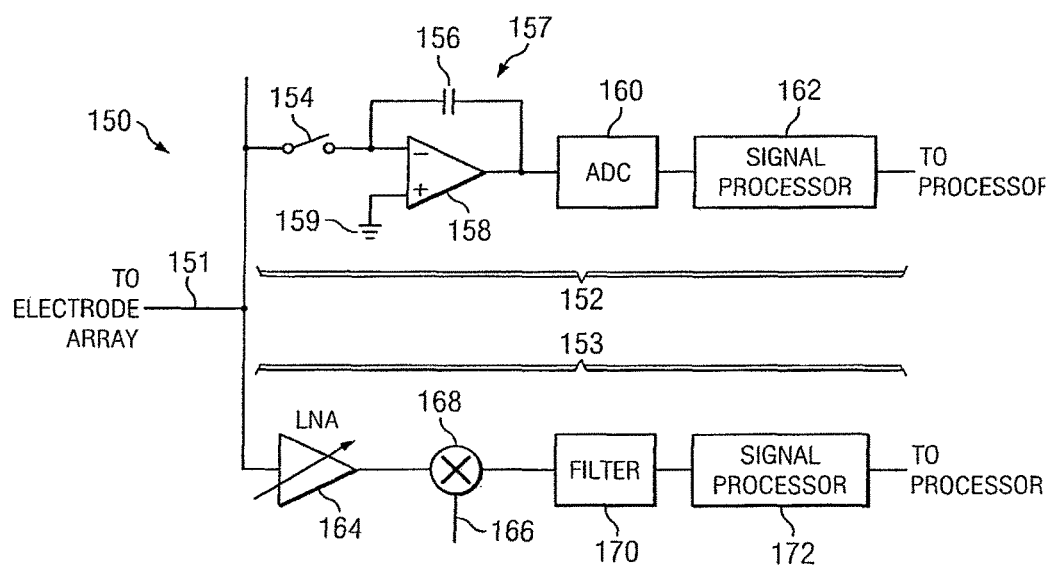
FIG. 6 illustrates an example measurement circuit that may be used in a touch-sensing device.

FIG. 6 illustrates an example measurement circuit 150 that may be used in touch-sensing device 100 from FIG. 4. Measurement circuit 150 may process the frequency division multiplexed composite signal generated by sender 220 from FIG. 3. As shown in FIG. 6, measurement circuit 150 includes electrode array connection 151, which is connected to electrode array 110. Electrode array connection 151 is connected to receive channel 152 and receive channel 153.

Receive channel 152 may be used to process the composite signal to determine the position of stylus 200 or a user's finger. Receive channel 153 may be used to process the composite signal to determine the stylus's status information, which may include, for example, the amount of force exerted on a portion of the stylus, the orientation of the stylus, information indicating if a portion of the stylus is within a threshold distance of a portion of touch-sensing device 100, and/or the status of a battery. The output of receive channels 152 and 153 may be connected to processor 176.

Receive channels 152 and 153 may allow touch-sensing device 100 to simultaneously process a composite signal received by electrode array 110 (not shown) in order to determine position information and status information in parallel. Because the signal received by the electrode lines of electrode array 110 contains both the lower frequency drive signal and the higher frequency data signal, receive channel 152 can analyze the changes in capacitance caused by the drive signal and detected at the various electrode lines of electrode array 110 in order to determine the position of stylus 200, while receive channel 153 can analyze the higher frequency information that may be encoded in the same signal to determine the status information of stylus 200. Thus, in some embodiments, touch-sensing device 20 may be able to determine the position of stylus 20 by analyzing the composite signal as a function of the first frequency and determine the information indicating the status of stylus 20 by analyzing the composite signal as a function of the second frequency.

As shown in FIG. 6, receive channel 152 may include switch 154, integrator 155, ADC 160, and signal processor 162. Integrator 155 includes capacitor 156 and op-amplifier 158. Switch 154 is connected to capacitor 156 and the inverting input of op-amplifier 158, and the non-inverting input of op-amplifier 158 may be connected to ground 159. The output of op-amplifier 158 is connected to capacitor 156 and to analog-to-digital converter (ADC) 160, which is connected to signal processor 162. Integrator 155 may be used to detect the drive signal component of the composite signal as received by electrode array 110, generating at its output a voltage proportional to the capacitance of one or more electrode lines of electrode array 110. By processing the signal received by each of the electrode lines of electrode array 110, touching sensing device can determine the position of stylus 200 or a user's finger. For example, the change in capacitance is greater at intersections of electrode lines 120 and 130 that are closer to the tip of stylus 200 or a user's finger. By analyzing the change in capacitance of the various electrodes, touch-sensing device 100 can thus determine the position of stylus 200 or a finger.

As shown in FIG. 6, receive channel 153 may include low noise amplifier (LNA) 164, mixer 168, mixer input connection 166, filter 170, and signal processor 172. Electrode array connection 151 is connected to LNA 164. The output of LNA 164 is connected to mixer 168, which is also connected to mixer input connection 166. The output of mixer 168 is connected to filter 170, which is connected to signal processor 172. Receive channel 152 may be used to demodulate the data signal component of the composite signal and determine the information indicating the status of the stylus. The composite signal can be processed by receive channel 153 in parallel with the processing of receive channel 152, which may allow for greater data throughput. In certain embodiments, decoding the data signal in a separate channel using demodulating techniques, rather than utilizing integrator 155 to decode the data signal, may make the system less prone to noise.

Figure 7:
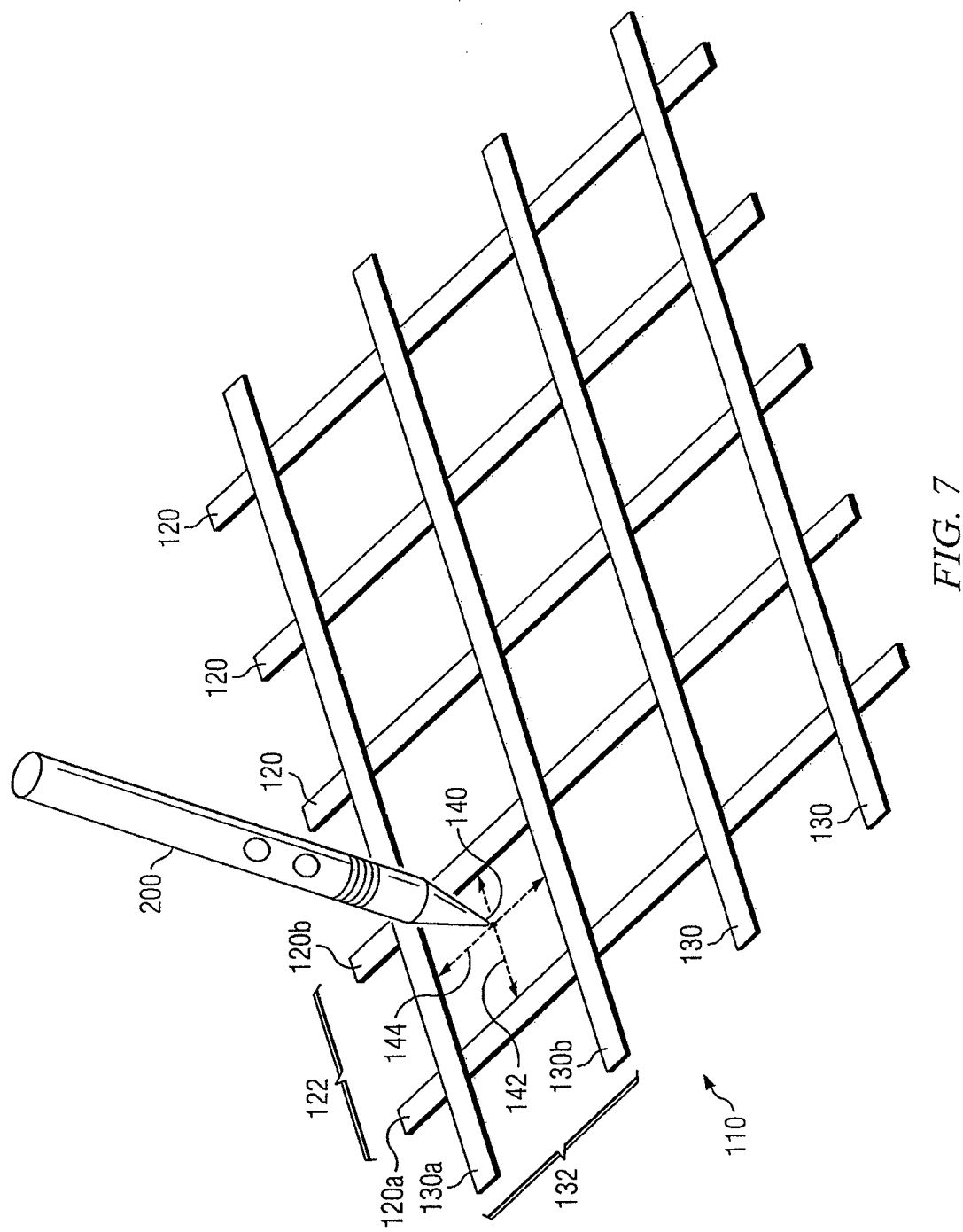
FIG. 7 illustrates an example stylus and electrode array that may be used in a touch-sensing system.

FIG. 7 illustrates an example stylus 200 and electrode array 110 that may be used in touch-sensing system 20 from FIG. 1. Electrode array 110 has electrode lines 120 and 130.

Electrode lines 120a and 120b form electrode line pair 122, and electrode lines 130a and 130b form electrode line pair 132. As shown in FIG. 7, Stylus 200 has a position 140 with respect to electrode array 110. Position 140 has an X-position along dimension 142 between electrode lines 120a and 120b and a Y-position along dimension 144 between electrode lines 130a and 130b. Signals sent by electrode line pairs 122 and 132, as well as other electrode line pairs formed by other electrode lines 120 and 130, may be detected by stylus 200 and used to determine position 140.

In some embodiments, electrode lines 120a and 120b may generate and/or send quadrature signals. For example, electrode lines 120a and 120b may send a first signal and a second signal, respectively, each signal having the same strength and same frequency, but with the second signal having a quadrature phase shift relative to the first signal. Stylus 200 may measure the signals sent by electrode line pair 122, detecting the strength of the first signal and the second signal. The relative strengths of these signals, as received by stylus 200, may be used to determine the relative distance of stylus 20 from electrode lines 120a and 120b and thereby determine the position of stylus 200 along dimension 142. This same process may be done in succession by all the electrode line pairs formed by electrode lines 120.

Furthermore, this process may be repeated with electrode line pair 132 and all other electrode line pairs formed by electrode lines 130. Just as the processing of quadrature signals sent by electrode line pair 122 was used to determine the position of stylus 200 along dimension 142, processing quadrature signals sent by electrode line pair 132 may allow for the determination of the position of stylus 200 along dimension 144. Thus, by repeating this process for all electrode line pairs formed by electrode lines 120 and 130, position 140 of stylus 200 can be determined. In some embodiments, stylus 200 may have a near-field coupling mechanism so that only a limited set of signals from electrode line pairs will be received.

In certain embodiments, stylus 200 may be configured to process the quadrature signals sent by the electrode line pairs of electrode array 110 and determine its own position, which it may then communicate back to touch-sensing device 100. In other embodiments, stylus 200 may be configured to detect the strengths of the received signals and communicate the strengths of the signals received from each electrode line back to touch-sensing device 100, at which point touch-sensing device 100 may determine the position of stylus 200 based on this information. In both of these embodiments, stylus 200 may communicate this information back to touch-sensing device 100 by using a separate wireless transmitter to generate a signal that may be received by receiver 180 (not shown) of touch-sensing device 100, or stylus 200 may communicate this information via electrode array 110. Communicating the information back to touch-sensing device 100 via electrode array 110 may utilize the same or similar methods to those described above for generating a data signal or a composite signal that can be detected by electrode array 110 and processed by measurement circuit 150 (not shown). For example, upon sensing quadrature signals sent by an electrode line pair of electrode array 110, stylus 200 may determine position and/or status information based on the received signal and then combine a drive signal and a data signal including the information into a composite signal (or by otherwise encoding the information on the drive signal) which would then be received by the touch-sensing device via electrode array 110.

Furthermore, in some embodiments, techniques other than quadrature signaling by electrode line pairs may be utilized to allow stylus 200 to differentiate the signals received from electrode array 110. For example, information distinguishing the electrode lines may be encoded onto the signals. Stylus 200 would then be able to decode the information, allowing it to determine which signal was received from which electrode line. Using this information in conjunction with the relative strength of the received signals and/or phase shift information may allow the touch-sensor to operate in a finger touch mode only, with respect to sensing capacitive or inductive changes in touch sensor 108, since stylus position could be detected by stylus 200 itself based on signals generated by the touch sensor. In other words, finger position could be directly detected by touch sensor 108 while stylus position is directly detected by stylus 200 and then communicated back to touch-sensing device 100.

In some embodiments, a first electrode line sends a first signal having a first frequency, and a second electrode line sends a second signal having a second frequency. The second signal may have a quadrature phase-shift relative to the first signal. Stylus 200 receives the first signal at a first strength and receives the second signal at a second strength. Stylus 200 sends a response signal to touch-sensing device 100, the response signal based on the first signal and the second signal, and the position of stylus 200 is determined based on the first and the second signal. The position of the stylus may be determined based at least on a difference between the first signal strength and the second signal strength. Furthermore, a third electrode line may send a third signal having a third frequency, a fourth electrode line may send a fourth signal having a fourth frequency, and the first and second electrode lines may be oriented in a first direction while the third and fourth electrode lines are oriented in a second direction, the first direction being different from the second direction. The first direction and the second direction may be substantially perpendicular. In determining the position of stylus 200, a position along a first axis may be determined based at least on the first signal and the second signal, and a position along the second axis may be determined based at least on the third signal and the fourth signal. In sending the response signal to touch-sensing device 100, a transmitter of stylus 200 may send the response signal to a wireless receiver of the touch-sensing device, or the response signal may be received by electrode array 110. The position of stylus 200 may be determined by stylus 200, and the response signal may include information indicating the position of stylus 200. The position of stylus 200 may also be determined by touch-sensing device 100, and the response signal may include information indicating the first strength and the second strength.

Figure 8:
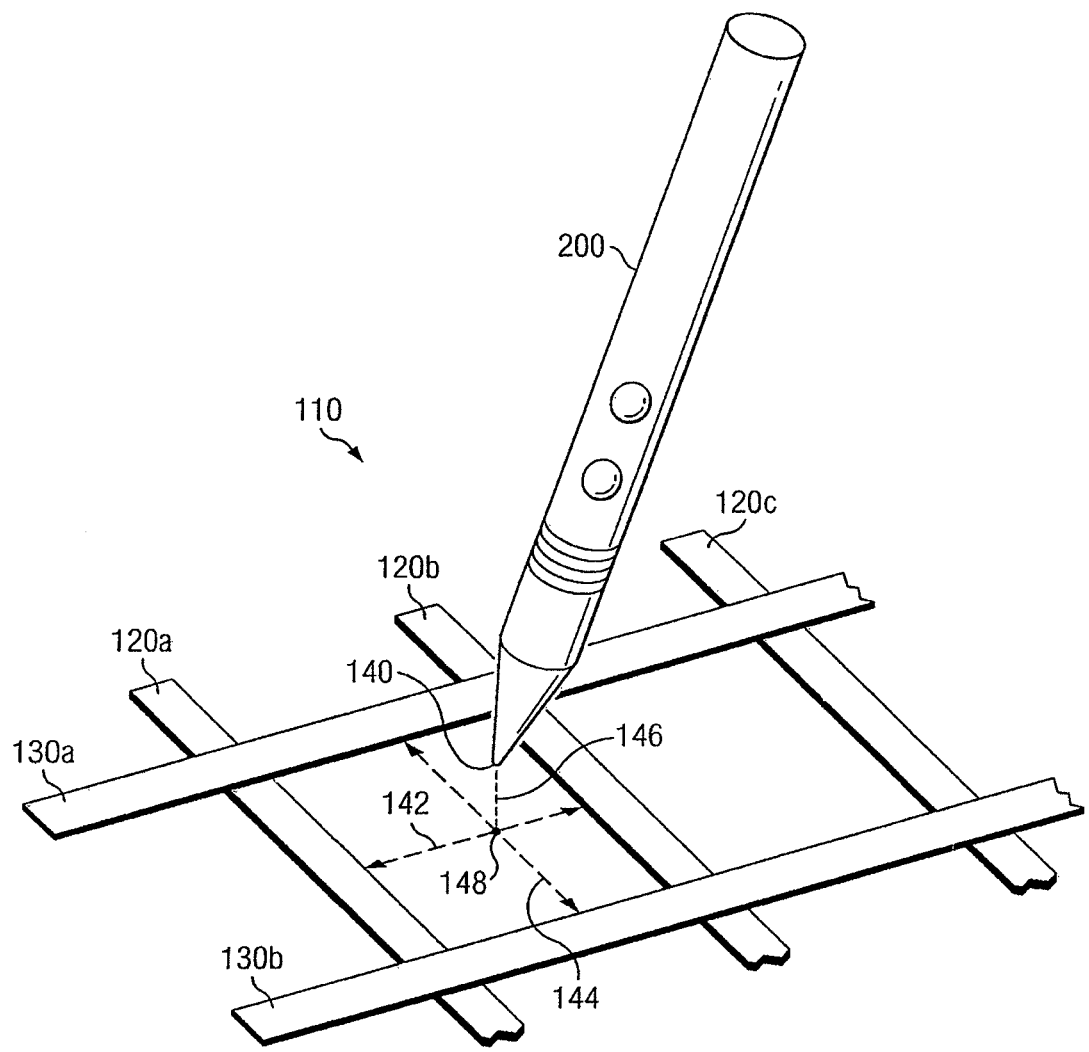
FIG. 8 illustrates relationships between an example stylus and electrode array that may be used in a touch-sensing system.

FIG. 8 illustrates example stylus 200 and electrode array 110 that may be used in touch-sensing system 20 from FIG. 1. As shown in FIG. 8, Stylus 200 has a stylus position 140 with respect to electrode array 110. Stylus position 140 is located distance 146 from X-Y position 148, which is an orthogonal projection of stylus position 140 onto the plane of electrode array 110. X-Y position 148 has an X-position along dimension 142 and a Y-position along dimension 144.

As described above, electrode array 110 may be configured to generate and/or send signals that may be detected by stylus 200. In some embodiments, the signals sent by electrode lines 120 and 130 may be encoded with information that allows stylus 200 to determine its position 140 relative to touch-sensing device 100. Encoding techniques may include, but are not limited to, spread-spectrum techniques, closed-loop power control, and other suitable techniques for generating a data signal that is under the noise floor of capacitive, inductive, or other touch-sensing techniques described above. This may ensure that the information encoded in the signal sent by electrode array 110 does not interfere with any of the other touch-sensing operations that may be performed by touch-sensing device 100 or stylus 200.

In some embodiments, electrode line 120a may send a signal including information identifying itself as the electrode line sending the signal. This signal may also include information identifying the strength at which the signal was generated. Stylus 200 may then receive the signal sent by electrode line 120a at a particular strength, the difference between the strength of the signal as generated and as received being proportional to the distance between electrode line 120a and stylus 200. This process may be repeated by electrode lines 120b, 120c, and other electrode lines 120 in electrode array 110. Furthermore, the same process can be repeated with electrode lines 130a, 130b, and other electrode lines 130 in electrode array 110. Thus, each electrode line 120 and 130 may send a signal to stylus 200, each signal including information identifying which electrode line sent the signal.

Furthermore, in some embodiments, the signal may also include information indicating the strength at which it was sent, while in other embodiments, touch-sensing device 100 may be configured to generate the signals at a known predetermined strength. The information identifying which electrode line sent which signal, in conjunction with the strength at which each of these signals was received by stylus 200, may be used to calculate the position of stylus 200 along dimensions 142 and 144 and thus X-Y position 148. This information may also be used to determine distance 146 and thus position 140 of stylus 200.

In some embodiments, stylus 200 may be configured to process the signals sent by electrode lines 120 and 130 and determine its own position, which it may then communicate back to touch-sensing device 100. In other embodiments, stylus 200 may be configured to communicate the information indicating which electrode line sent each signal and the strength of each signal, as detected by stylus 200, back to touch-sensing device 100. In such embodiments, touch-sensing device 100 may then determine position 140 of stylus 200 based on this information. In both of these embodiments, stylus 200 may communicate this information back to touch-sensing device 100 by using a separate wireless transmitter to generate a signal that may be received by receiver 180 (not shown) of touch-sensing device 100, or stylus 200 may communicate this information via electrode array 110. Communicating the information back to touch-sensing device 100 via electrode array 110 may utilize the same or similar methods to those described above for generating a data signal or composite signal that can be detected by electrode array 110 and processed by measurement circuit 150 (not shown). For example, in some embodiments, stylus 200 may receive signals sent by electrode lines 120 and 130, the signals encoded with information identifying which electrode line sent which signal. Stylus 200 may then send a response signal to touch-sensing device 100 via electrode array 110 based on the strength at which each signal was received and the encoded information.

In some embodiments, a first electrode line of an electrode array sends a first signal including information identifying the first electrode line, the first signal having a first strength. The first electrode line sends the first signal to stylus 200. Touch-sensing device 100 then receives a received signal from stylus 200, the received signal based at least in part on the information identifying the first electrode line and a strength at which the first signal was received by the stylus. The position of stylus 200 is then determined based at least in part on the information identifying the first electrode line and the strength at which the first signal was received by the stylus. The received signal may include information indicating the strength at which the first signal was received by stylus 200 and information identifying the first electrode line. The received signal may include information indicating the position of the stylus. The first signal may also include information indicating the strength at which the first signal was sent by the first electrode line, and the determination of the position of stylus 200 may be based further on the difference between the strength at which the first signal was sent by the first electrode and the strength at which the first signal was received by the stylus. The position of stylus 200 may include a position along a first, second, and third axes, wherein the first axis is different from the second axis, the first and second axes are substantially parallel to the electrode array, and the third axis is substantially perpendicular to the electrode array.

Furthermore, a second electrode line of the electrode array may send a second signal including information identifying the second electrode line, and determining the position of stylus 200 may be based further on the information identifying the second electrode line and a strength at which the second signal was received by stylus 200. A third electrode line of the electrode array may send a third signal including information identifying the third electrode line, and a fourth electrode line of the electrode array may send a fourth signal including information identifying the fourth electrode line. The first and second electrode lines may be oriented in a substantially similar first direction, and the third and fourth electrode lines may be oriented in a substantially similar second, the first direction being different from the second direction. The first direction and the second direction may be substantially perpendicular.

In other embodiments, stylus 200 receives a first signal including information identifying a first electrode line of an electrode array of touch-sensing device 100, the first signal have a first received strength. Stylus 200 analyzes the first signal to determine the first received strength and the information identifying the first electrode line. Stylus 200 then generates a first response signal based at least in part on the first received strength and the information identifying the first electrode line and sends the first response signal to touch-sensing device 100. Stylus 200 may receive a second signal comprising information identifying a second electrode line of the electrode array, the second signal having a second received strength. The first response signal may be based further on the second received strength and the information identifying the second electrode line, or stylus 200 may generate a second response signal based at least in part on the second received strength and the information identifying the second electrode line. The first signal may further include information indicating a strength at which the first signal was sent by the first electrode line. The first response signal may include the position of stylus 200, and stylus 200 may determine its position based at least in part on the first received strength, the information identifying the first electrode line, the second received strength, and the information identifying the second electrode line Encoded signals generated by touch sensor 108 and received by stylus 200 with information used to determine the position of stylus 200 may improve the ability of touch sensor 108 to operate without interference. Using methods such as spread spectrum schemes or closed-loop power control may allow stylus 200 to receive signals that remain below the noise floor of touch sensor 108. The reduced interference of this "water-marking" signaling scheme may improve the ability of finger-sensing and touch-sensing signaling to operate simultaneously. Furthermore, since finger-sensing and stylus-sensing schemes may require different signaling levels and time budgets for electrode touch sensor 108, detecting finger position and stylus position via different pathways may improve performance of touch-sensing system 20 by obviating the need to accommodate their conflicting requirements in the same receive channel. Since design compromises caused by conflicting timing and signaling requirements of finger-sensing and stylus-sensing may be avoided, these methods may allow for improved performance of both finger-sensing and stylus-sensing.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Various embodiments disclosed herein may be used together in a variety of combinations. In some embodiments, touch-sensing system 20 may use different types of touch-sensing device 100 and stylus 200, and touch-sensing device 100 and stylus 200 may have different numbers and types of components, as well as different configuration and organization of those components. For example, in certain embodiments, stylus 200 may have different numbers and types of processor 210, sender 220, and receiver 260, as well as additional components. As another example, in various embodiments, electrode array 110 may have different types, numbers, and orientations of electrodes lines 120 and 130. For example, in some embodiments, electrode lines 120 and 130 may form a grid of perpendicular lines, while in other embodiments, electrode lines 120 and 130 may different sizes, shapes, and orientations.

Furthermore, in various embodiments, touch-sensing system 20 may utilize one or more of the communication methods described above to communicate information between touch-sensing device 100 and stylus 200 and vice versa. For example, in some embodiments, stylus 200 may receive a signal from touch-sensing device 100 that includes encoded information while also sending a combined signal including a drive signal and a data signal to touch-sensing device 100 via electrode array 110. In other embodiments, stylus 200 may receive quadrature signals from electrode line pairs 122 and 132 while also sending a combined signal including a drive signal and a data signal to touch-sensing device 100 via electrode array 110. In still other embodiments, stylus 200 may receive quadrature signals from electrode line pairs 122 and 132, each quadrature signal encoded with information that may be used by stylus 200 to determine position and/or other information.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A stylus comprising:
   a sensor configured to perform operations comprising measuring a first signal strength of a first signal generated by a first electrode line of an electrode array of a touch-sensing device and a second signal strength of a second signal generated by a second electrode line of the electrode array of the touch-sensing device, the first electrode line and the second electrode line being a first electrode line pair of a plurality of electrode line pairs of the electrode array and being oriented in a first direction along a first axis of the electrode array, the second electrode line being adjacent to the first electrode line, the first signal encoded with information identifying that the first signal was generated by the first electrode line;
   a signal processor configured to perform operations comprising decoding the information identifying that the first signal was generated by the first electrode line and determining position information based at least on the information identifying that the first signal was generated by the first electrode line and the first signal and the second signal, the position information comprising an indication of a position of the stylus along the first axis of the electrode array, wherein the signal processor is configured to determine the position information based at least on a difference between the first signal strength and the second signal strength,
   wherein:
      determining the position information comprising an indication of the position of the stylus comprises determining a first-dimensional position of the stylus along the first axis based at least on the first signal and the second signal; and
      the first-dimensional position is a location within a plane of the electrode array of the touch-sensing device; and
   a transmitter configured to send a signal comprising the position information to the touch-sensing device.

2. The stylus of claim 1, wherein the first signal comprises an in-phase signal, and the second signal comprises a quadrature-phase signal.

3. The stylus of claim 1, wherein the plurality of electrode line pairs comprises a second electrode line pair oriented in a second direction along a second axis of the electrode array, the first direction being different from the second direction, the second electrode line pair comprising a third electrode line oriented in the second direction and a fourth electrode line oriented in the second direction, the fourth electrode line being adjacent to the third electrode line.

4. The stylus of claim 3, wherein:
   the sensor is configured to perform operations comprising measuring a third signal strength of a third signal generated by the third electrode line and a fourth signal strength of a fourth signal generated by the fourth electrode line;
   determining the position information comprising an indication of the position of the stylus further comprises determining a second-dimensional position of the stylus along the second axis based at least on the third signal of the second electrode line pair and the fourth signal of the second electrode line pair; and
   the position information indicates at least the first-dimensional position of the stylus along the first axis and the second-dimensional position along the second axis.

5. The stylus of claim 3, wherein the first direction and the second direction are substantially perpendicular.

6. The stylus of claim 1, wherein the transmitter comprises a wireless transmitter configured to send the signal comprising the position information to the touch-sensing device by performing operations comprising sending the signal comprising the position information to a wireless receiver of the touch-sensing device.

7. The stylus of claim 1, wherein the transmitter is further configured to send the signal comprising the position information to the touch-sensing device via the electrode array of the touch-sensing device.

8. The stylus of claim 1, wherein the position information comprises the first signal strength and the second signal strength, and wherein the touch-sensing device further comprises a position-calculating module configured to determine a position of the stylus based on the position information.

9. A non-transitory computer-readable medium comprising logic, the logic when executed by a processor configured to cause the processor to perform operations comprising:
   accessing a first signal strength of a first signal received by a stylus and generated by a first electrode line of an electrode array of a touch-sensing device, the first signal strength of the first signal measured by the stylus, the first signal having a first frequency;
   accessing a second signal strength of a second signal received by the stylus and generated by a second electrode line of the electrode array of the touch-sensing device, the second signal strength of the second signal measured by the stylus, the first electrode line and the second electrode line being oriented in a first direction along a first axis of the electrode array, the second electrode line being adjacent to the first electrode line, the first signal encoded with information identifying that the first signal was generated by the first electrode line;
   decoding the information identifying that the first signal was generated by the first electrode line; and
   determining a position of the stylus based on the information identifying that the first signal was generated by the first electrode line and the first signal and the second signal, wherein the position of the stylus is determined based at least on a difference between the first signal strength and the second signal strength, and wherein determining the position of the stylus comprises determining, based at least on the first signal and the second signal, a first-dimensional position of the stylus along the first axis, wherein the first-dimensional position is a location within a plane of the electrode array of the touch-sensing device.

10. The non-transitory computer-readable medium of claim 9, wherein the second signal has a quadrature phase-shift relative to the first signal.

11. The non-transitory computer-readable medium of claim 9, wherein the operations further comprise:

accessing a third signal strength of a third signal received by the stylus and generated by a third electrode line of the electrode array, the third signal having a third frequency; and accessing a fourth signal strength of a fourth signal received by the stylus and generated by a fourth electrode line of the electrode array, the fourth signal having a fourth frequency;

wherein the third and fourth electrode lines are oriented in a second direction along a second axis of the electrode array, and wherein the first direction is different from the second direction.

12. The non-transitory computer-readable medium of claim 11, wherein determining the position of the stylus comprises determining, based at least on the third signal and the fourth signal, a second dimensional position of the stylus along the second axis.

13. The non-transitory computer-readable medium of claim 11, wherein the first direction and the second direction are substantially perpendicular.

14. The non-transitory computer-readable medium of claim 9, wherein the operations further comprise controlling the stylus to send, by a wireless transmitter of the stylus, a response signal to a wireless receiver of the touch-sensing device, the response signal comprising information indicating the position of the stylus.

15. The non-transitory computer-readable medium of claim 9, wherein the operations further comprise controlling the stylus to send a response signal to the touch-sensing device via the electrode array of the touch-sensing device, the response signal comprising information indicating the position of the stylus.

16. The non-transitory computer-readable medium of claim 9, wherein the operations further comprise controlling the stylus to send a response signal to the touch-sensing device, the response signal comprising information indicating the first strength and the second strength, the touch-sensing device being configured to determine the position of the stylus based on the position information.

17. The stylus of claim 1, wherein:
the first signal generated by the first electrode line comprises information distinguishing the first electrode line from the second electrode line; and
the stylus is configured to determine the information distinguishing the first electrode line from the second electrode line.

18. The non-transitory computer-readable medium of claim 9, wherein:
the first signal generated by the first electrode line comprises information distinguishing the first electrode line from the second electrode line; and
the operations further comprise determining the information distinguishing the first electrode line from the second electrode line.

19. A method, comprising:
accessing, by a processor, a first signal strength of a first signal received by a stylus and generated by a first electrode line of an electrode array of a touch-sensing device, the first signal strength of the first signal measured by the stylus, the first signal having a first frequency;

accessing, by the processor, a second signal strength of a second signal received by the stylus and generated by a second electrode line of the electrode array of the touch-sensing device, the second signal strength of the second signal measured by the stylus, the first electrode line and the second electrode line being oriented in a first direction along a first axis of the electrode array, the second electrode line being adjacent to the first electrode line, the first signal encoded with information identifying that the first signal was generated by the first electrode line;

decoding the information identifying that the first signal was generated by the first electrode line; and determining, by the processor, a position of the stylus based on the information identifying that the first signal was generated by the first electrode line and the first signal and the second signal, wherein the position of the stylus is determined based at least on a difference between the first signal strength and the second signal strength, and wherein determining the position of the stylus comprises determining, based at least on the first signal and the second signal, a first-dimensional position of the stylus along the first axis, wherein the first-dimensional position is a location within a plane of the electrode array of the touch-sensing device.

* * * * *